(12) United States Patent
Choo et al.

(10) Patent No.: US 7,466,374 B2
(45) Date of Patent: Dec. 16, 2008

(54) LIQUID CRYSTAL DISPLAY

(75) Inventors: Dae-Ho Choo, Seagnam-si (KR); Ho-Min Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 184 days.

(21) Appl. No.: 11/671,829

(22) Filed: Feb. 6, 2007

(65) Prior Publication Data

US 2007/0291199 A1    Dec. 20, 2007

(30) Foreign Application Priority Data

Jun. 14, 2006    (KR)    ............... 10-2006-0053595

(51) Int. Cl.
*G02F 1/1335*    (2006.01)
(52) U.S. Cl. ............................................. 349/69
(58) Field of Classification Search .................... 349/69
See application file for complete search history.

(56) References Cited

U.S. PATENT DOCUMENTS

| | | | | |
|---|---|---|---|---|
| 4,772,885 A | * | 9/1988 | Uehara et al. | 349/71 |
| 5,504,599 A | * | 4/1996 | Okibayashi et al. | 349/69 |
| 2004/0119404 A1 | * | 6/2004 | Kato et al. | 313/506 |

* cited by examiner

*Primary Examiner*—David Nelms
*Assistant Examiner*—Phu Vu
(74) *Attorney, Agent, or Firm*—MacPherson Kwok Chen & Heid LLP (57) ABSTRACT

A liquid crystal display includes a liquid crystal layer and a light supply part providing light to the liquid crystal layer, and the liquid crystal layer and the light supply part are disposed between a first base substrate and a second base substrate. The light supply part is located inside the liquid crystal display to reduce a distance between the light supply part and the liquid crystal layer. Thus, the liquid crystal display may have reduced thickness and weight and enhanced brightness, thereby improving the display characteristics of the display.

18 Claims, 6 Drawing Sheets

LIQUID CRYSTAL DISPLAY

CROSS-REFERENCE TO RELATED APPLICATION

This application relies for priority upon Korean Patent Application No. 2006-53595 filed on Jun. 14, 2006, the contents of which are herein incorporated by reference in its entirety.

BACKGROUND OF THE INVENTION

1. Field of the Invention

The present invention relates to a liquid crystal display. More particularly, the present invention relates to a liquid crystal display capable of reducing light loss thereof.

2. Description of the Related Art

In general, a liquid crystal display includes a liquid crystal display panel that displays an image using light, and a backlight assembly that generates the light.

The liquid crystal display panel displays an image using an electrical-optical property of liquid crystal. The liquid crystal display panel requires a light source such as the backlight assembly, since the liquid crystal display panel is not self-emissive.

Since the light for the liquid crystal display panel is entirely supplied by the backlight assembly, the brightness of the liquid crystal display panel is decreased when brightness of the backlight assembly is decreased, leading to deterioration of the display quality of the liquid crystal display. That is, the display quality of the liquid crystal display depends on the brightness of the backlight assembly.

However, the backlight assembly is installed in the liquid crystal display separately from the liquid crystal display panel, so that light from the backlight assembly is lost in supplying the light to the liquid crystal display panel. As a result, the brightness of the backlight assembly is decreased, as is the brightness of the liquid crystal display panel.

In order to prevent light loss, the backlight assembly further includes optical sheets capable of enhancing brightness. The optical sheets improve brightness characteristics of light generated from the backlight assembly or reflect light leaked from the backlight assembly to the liquid crystal display panel.

However, since the liquid crystal display and the optical sheets absorb some light, light loss still occurs. Furthermore, the backlight assembly is disposed at a rear face of the liquid crystal display panel, increasing the thickness and weight of the liquid crystal display.

SUMMARY OF THE INVENTION

The present invention provides a liquid crystal display capable of reducing light loss and the thickness of the display.

In one aspect of the present invention, a liquid crystal display includes a first base substrate, a second base substrate, a liquid crystal layer, a light supply part and an array layer.

The second base substrate is attached to the first base substrate. The liquid crystal layer is disposed between the first and second base substrates and is configured to receive a pixel voltage to control transmittance of light. The light supply part is disposed between the first base substrate and the liquid crystal layer and is configured to generate light and to supply the light to the liquid crystal layer. The array layer is interposed between the light supply part and the second base substrate and includes at least one pixel part configured to output the pixel voltage.

The light supply part includes a first electrode part, a second electrode part, a fluorescent member, and a protective member.

The first electrode part is formed on the first base substrate. The second electrode part is formed on the first base substrate. The fluorescent member is disposed between the first and second electrode parts and configured to emit light in response to an electric field generated between the first and second electrode parts. The protective member is interposed between the second electrode part and the liquid crystal layer and coupled to the first base substrate.

The light emitted from the fluorescent member may include red light, green light and blue light, or may include white light.

The array substrate may include at least one dot part having, in operation, a gray-scale value corresponding to the image, and the dot part includes at least three pixel parts adjacent to each other. The light supply part may emit red, green, and blue light and the first, second and third light emitting parts adjacent to each other may correspond to the dot part. The first, second and third light emitting parts adjacent to each other may have the same gray-scale value as that of the dot part.

According to the current disclosure, the light supply part is disposed between the array substrate and the opposite substrate and formed on the array substrate or the opposite substrate. Thus, the liquid crystal display does not need to employ a separate backlight assembly, so that the thickness and the weight of the liquid crystal display may be reduced, thereby lowering the manufacturing cost of the display.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention, and designation of an element as "first" does not imply the need for a "second" or additional element.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
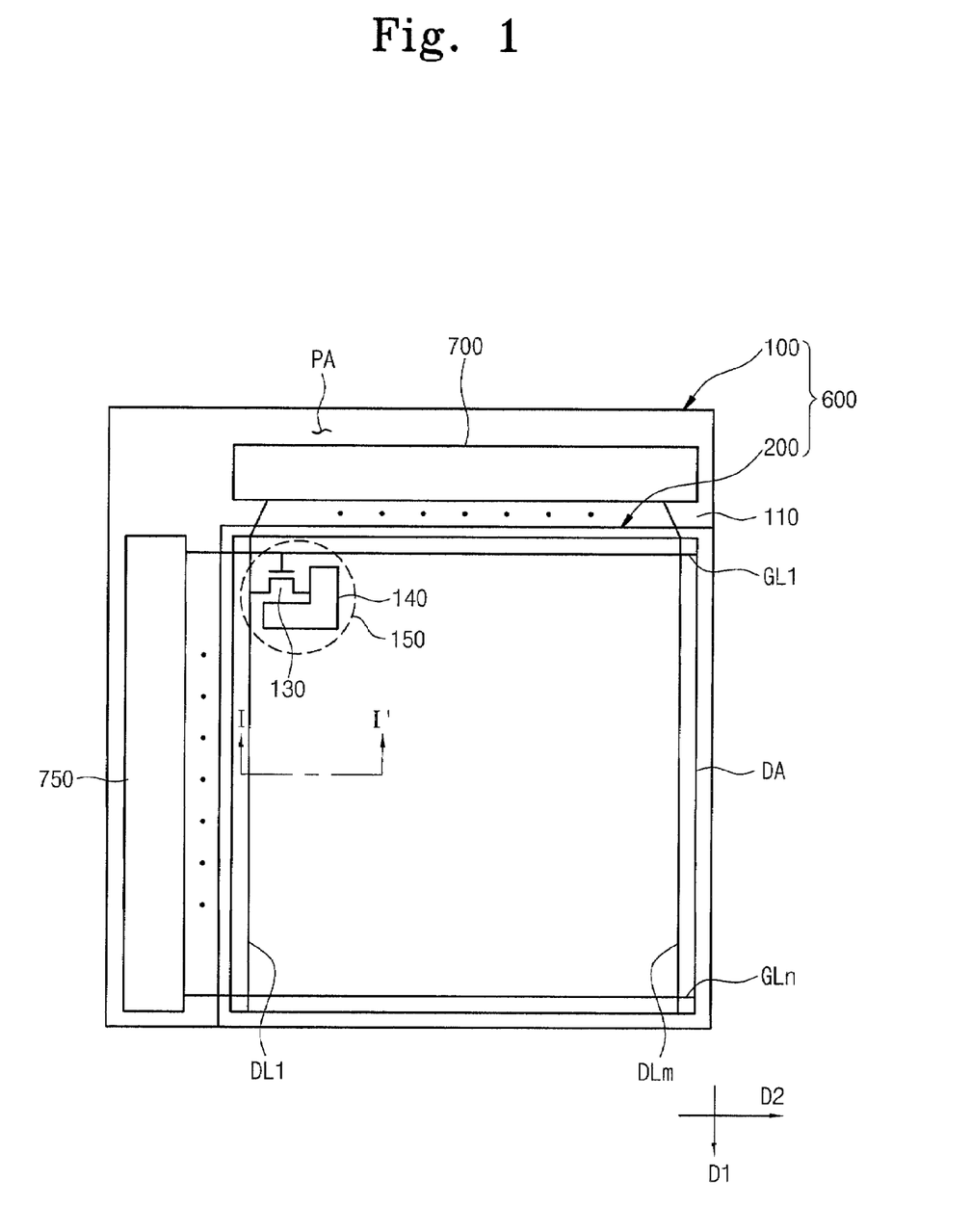
FIG. 1 is a plan view showing an exemplary embodiment of a liquid crystal display according to the present invention.
Figure 2:
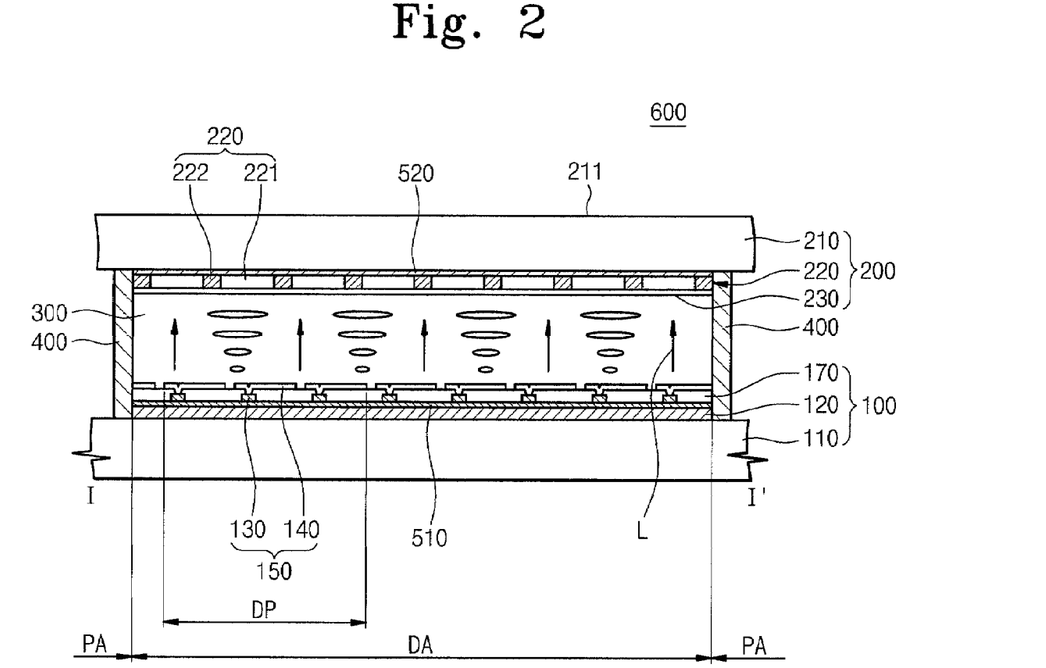
FIG. 2 is a cross-sectional view taken along a line I-I' of FIG. 1.

FIG. 1 is a plan view showing an exemplary embodiment of a liquid crystal display according to the present invention. FIG. 2 is a cross-sectional view taken along a line I-I' of FIG. 1.

Referring to FIGS. 1 and 2, a liquid crystal display 600 includes an array substrate 100, an opposite substrate 200 facing the array substrate 100, a liquid crystal layer 300 interposed between the array substrate 100 and the opposite substrate 200, and a first attachment member 400 that attaches the array substrate 100 to the opposite substrate 200.

Particularly, the array substrate 100 includes a first base substrate 110, a light supply part 120 that generates light and an array layer 170.

The first base substrate 110 includes a transparent material such as glass, quartz, sapphire, silicon, etc. The first base substrate 110 is divided into a display area DA on which an image is displayed and a peripheral area PA surrounding the display area DA.

The light supply part 120 is formed in the display area DA of the first base substrate 110. The light supply part 120 generates light (L) in response to a voltage to supply the light (L) to the liquid crystal layer 300. The light supply part 120 will be described in more detail later with reference to FIG. 6.

The array layer 170 is formed on the light supply part 120. The array layer 170 includes a plurality of data lines DL1, ..., DLm, a plurality of gate lines GL1, ..., GLn, and a plurality of pixel parts 150. In the present embodiment, 'm' and 'n' are natural numbers greater than or equal to '1'.

The data lines DL1, ..., DLm extend in a first direction D1 and are arranged in a second direction D2 substantially perpendicular to the first direction D1, and are separate from each other. The data lines DL1, ..., DLm are electrically connected to a first driver part 700 formed in the peripheral area PA. The data lines DL1, ..., DLm apply a data signal that is provided by the first driver part 700 to the display area DA.

The gate lines GL1, ..., GLn extend in the second direction D2 and cross the data lines DL1, ..., DLm while being insulated from the data lines DL1, ..., DLm. The gate lines GL1, ..., GLn are electrically connected to a second driver part 750 formed in the peripheral area PA. The gate lines GL1, ..., GLn apply a gate signal that is provided from the second driver part 750 to the display area DA.

The pixel parts 150 are arranged in a matrix configuration and each of the pixel parts 150 outputs a pixel voltage corresponding to an image portion to be displayed. The pixel parts 150 are electrically connected to the data lines DL1, ..., DLm and the gate lines GL1, ..., GLn to receive the data signal and the gate signal, respectively.

Hereinafter, the pixel parts 150 will be described in more detail below, with reference to the figures.

Figure 3:
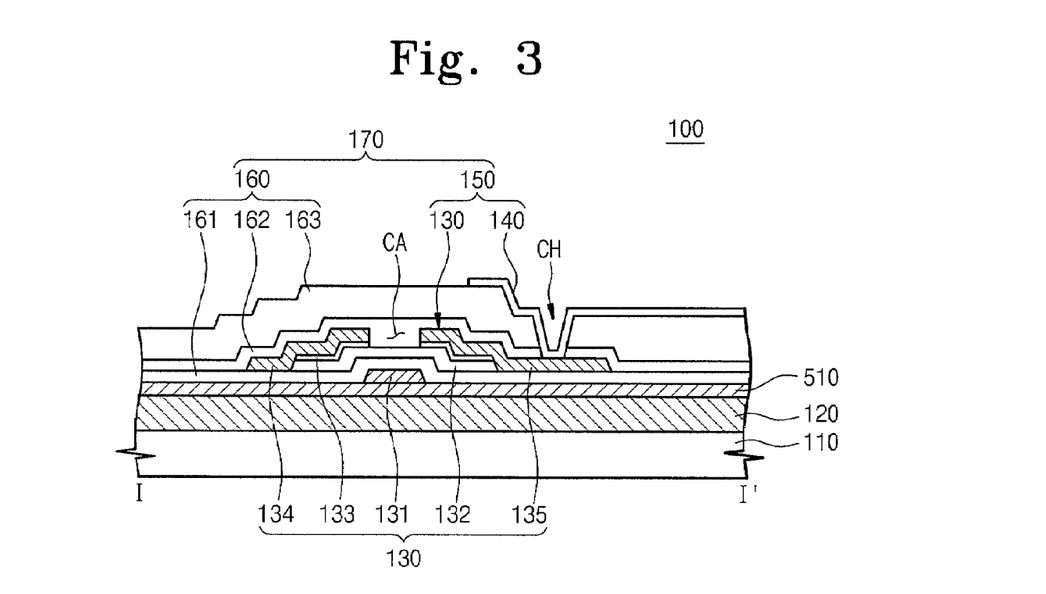
FIG. 3 is a cross-sectional view showing the array substrate of FIG. 2.

FIG. 3 is a cross-sectional view showing the array substrate of FIG. 2.

Referring to FIGS. 1 to 3, the pixel parts 150 are formed on the light supply part 120. Each of the pixel parts 150 includes a thin film transistor (hereinafter, referred to as a TFT) 130 outputting the pixel voltage and a pixel electrode 140 electrically connected to the TFT 130.

The TFT 130 includes a gate electrode 131 formed at an upper portion of light supply part 120, an active layer 132 formed at an upper portion of the gate electrode 131, an ohmic contact layer 133 formed on the active layer 132, and source and drain electrodes 134 and 135 formed on the ohmic contact layer 133.

Particularly, the gate electrode 131 extends from a corresponding gate line among the gate lines GL1, ..., GLm.

The active layer 132 is formed at the upper portion of the light supply part 120 to cover the gate electrode 131. The ohmic contact layer 133 includes n$^+$amorphous silicon and is formed on the active layer 132. The active layer 132 is exposed through a channel area CA formed by partially removing the ohmic contact layer 133.

The source electrode 134 and the drain electrode 135 are spaced apart from each other by the channel area CA disposed therebetween. The source electrode 134 extends from a corresponding data line among the data lines DL1, ..., DLm. The drain electrode 135 applies the pixel voltage to the pixel electrode 140.

The pixel electrode 140 applies the pixel voltage from the TFT 130 to the liquid crystal layer 300. The pixel electrode 140 includes a transparent conductive material, such as indium tin oxide (ITO) or indium zinc oxide (IZO).

Referring to FIGS. 2 and 3, three adjacent pixel parts of the pixel parts 150 define one dot part DP, and plural dot parts are defined by the pixel parts 150. In operation, the dot parts have gray-scale values corresponding to the image to be displayed. That is, each of the dot parts has a gray-scale value that is previously set to display an associated image part of the image to be displayed, in response to the gray-scale value of the particular dot part.

In the present embodiment, one dot part DP includes three pixel parts, but the number of the pixel parts 150 constituting the one dot part DP may be greater than three or less than three, due to the number of the pixel parts 150 and a driving method for the array substrate 100.

The array layer 170 may further include a plurality of insulation layers 160. The insulation layers 160 include a gate insulation layer 161, a protective layer 162 and an organic insulation layer 163.

The gate insulation layer 161 is formed on the light supply part 120 on which the gate electrode 131 and the gate lines GL1, ..., GLn are formed, and the active layer 132 is formed on the gate insulation layer 161.

The protective layer 162 is formed on the gate insulation layer 161 on which the TFT 150 and the data lines DL1, ..., DLm are formed to protect the TFT 150 and the data lines DL1, ..., DLm.

The organic insulation layer 163 is formed on the protective layer 162, and the pixel electrode 140 is formed on the organic insulation layer 163. The drain electrode 135 is exposed through a contact hole CH formed by partially removing the protective layer 162 and the organic insulation layer 163. The pixel electrode 140 is electrically connected to the drain electrode 135 through the contact hole CH.

Referring again to FIGS. 1 and 2, the opposite substrate 200 is positioned relative to an upper portion of the array substrate 100 so that the opposite substrate 200 faces the array substrate 100.

The opposite substrate 200 includes a second base substrate 210, a color filter layer 220 and a common electrode 230.

The second base substrate 210 is attached to the first base substrate 110 and includes a transparent material through which the light may pass, such as glass, quartz, sapphire, silicon, etc.

The color filter layer 220 is formed on the second base substrate 210. The color filter layer 220 includes red, green and blue (RGB) color pixels 221 displaying predetermined colors using the light (L) and a black matrix 222 surrounding the RGB color pixels 221. The black matrix 222 blocks light leaked from the RGB color pixels 221, to improve the contrast ratio of the display.

The common electrode 230 is formed on the color filter layer 220 and applies a common voltage to the liquid crystal layer 300.

The liquid crystal layer 300 interposed between the array substrate 100 and the opposite substrate 200 controls transmittance of the light (L) in response to an electric field generated between the array substrate 100 and the opposite substrate 200. The opposite substrate 200 receives light passing through the liquid crystal layer 300 to display the predetermined colors, thereby displaying the image on the opposite substrate 200.

The first attachment member 400 is formed in the peripheral area PA and disposed between the array substrate 100 and the opposite substrate 200. The first attachment member 400 attaches the array substrate 100 to the opposite substrate 200 and seals the liquid crystal layer 300 in the display area DA.

The liquid crystal display 600 further includes a first polarization member 510 and a second polarization member 520 to polarize the light.

The first polarization member 510 is formed on the light supply part 120 and polarizes the light to a predetermined direction.

Figure 4:
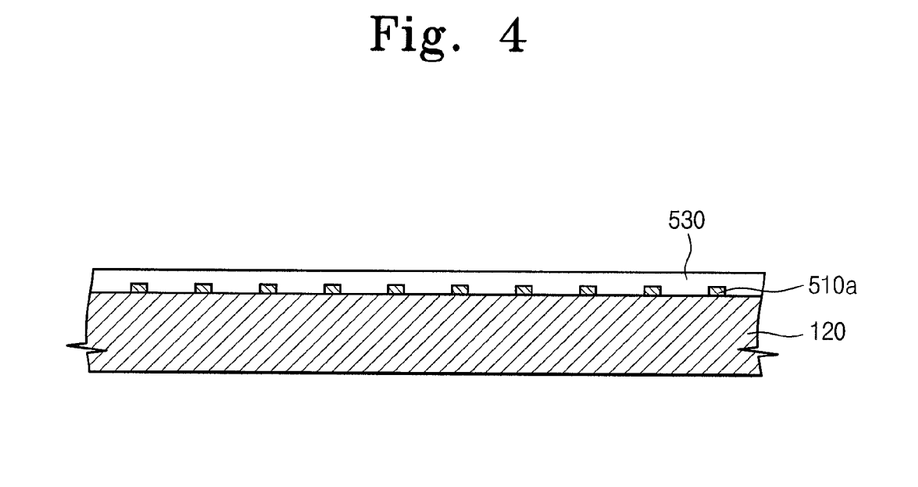
FIG. 4 is a sectional view showing an exemplary embodiment of the first polarization member of FIG. 2.

FIG. 4 is a sectional view showing an exemplary embodiment of the first polarization member of FIG. 2.

Referring to FIGS. 2 and 4, the first polarization member 510 may be a metal material like aluminum or may be a cholesteric liquid crystal. In an embodiment in which the first polarization member 510 includes a metal material, the first polarization member 510 is partially removed so a dot pattern remains, when viewed in a plan view as shown in FIG. 4. Further, in an embodiment in which the first polarization member 510 includes a metal material, an insulation layer 530 may be formed between the first polarization member 510 and the TFT 130 to insulate the first polarization member 510 and the TFT 130. On the other hand, in an embodiment in which the first polarization member 510 includes a cholesteric liquid crystal, the insulation layer 530 between the first polarization member 510 and the TFT 130 may be omitted, and the first polarization member 510 need not be patterned as shown in FIG. 4. The first polarization member 510 reflects the light (L) supplied from the light supply part 120 to polarize the light (L), and then provides the polarized light to the liquid crystal layer 300.

The second polarization member 520 is formed on the second base substrate 210. The second polarization member 520 polarizes the light passing through the liquid crystal layer 300 in a substantially perpendicular direction with respect to the polarization direction of the first polarization member 510.

In the present embodiment, the second polarization member 520 is located inside the liquid crystal display 600, but the second polarization member 520 may be located outside the liquid crystal display 600.

Figure 5:
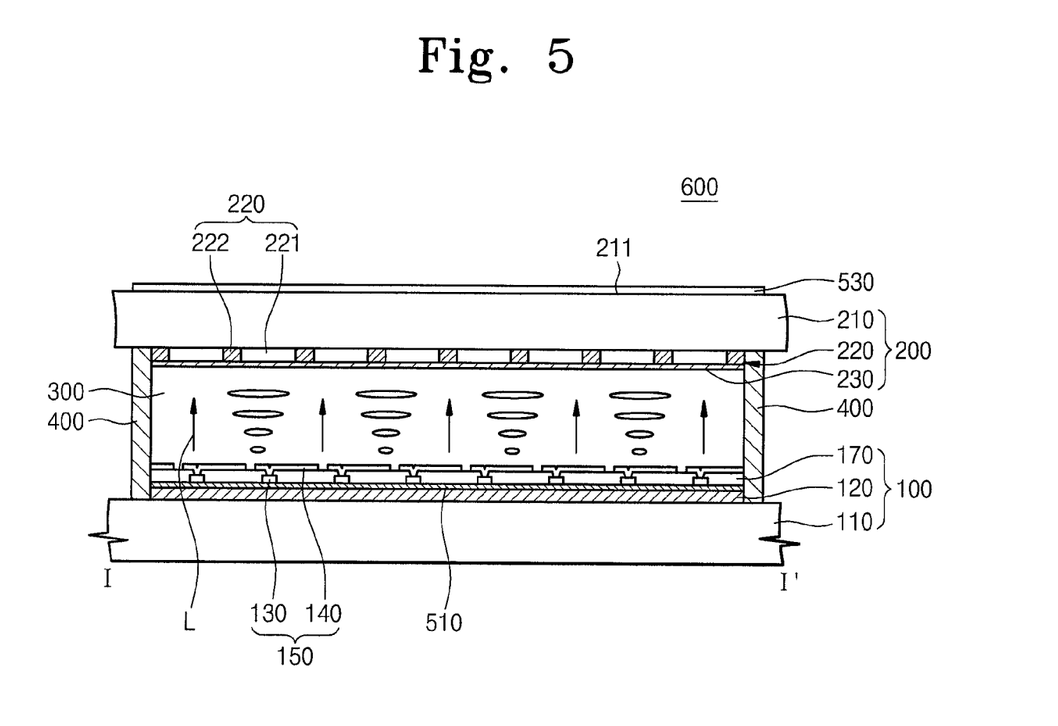
FIG. 5 is a sectional view showing another exemplary embodiment of the second polarization member of FIG. 2.

FIG. 5 is a sectional view showing another exemplary embodiment of the second polarization member of FIG. 2. In FIG. 5, the same reference numerals denote the same elements in FIG. 2, and thus additional description of these elements may be omitted.

Referring to FIG. 5, the second polarization member 530 is formed on an external face 211 of the second base substrate 210. In the illustrated embodiment, the second polarization member 530 has a sheet shape and polarizes light passing through the second base substrate 210 to a direction substantially perpendicular to the polarization direction of the first polarization member 510.

Hereinafter, the light supply part 120 will be described in more detail, with reference to the figures.

Figure 6:
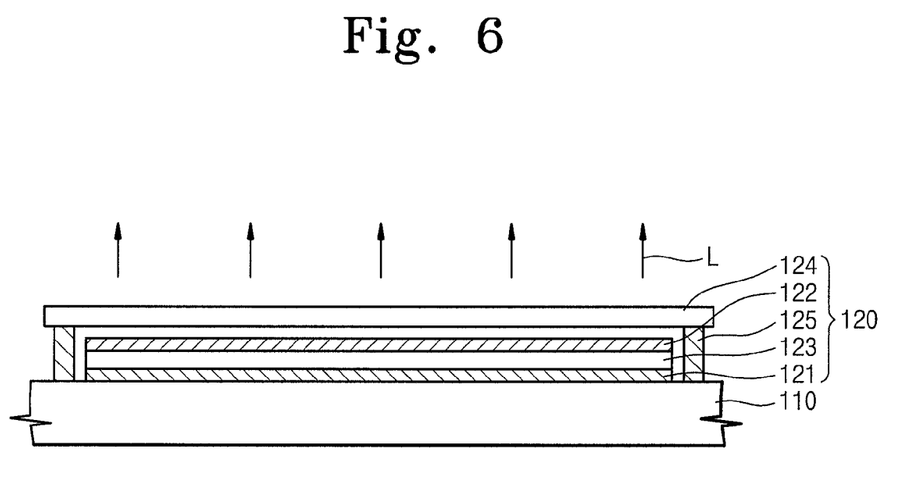
FIG. 6 is a sectional view showing an exemplary embodiment of the light supply part.
Figure 7:
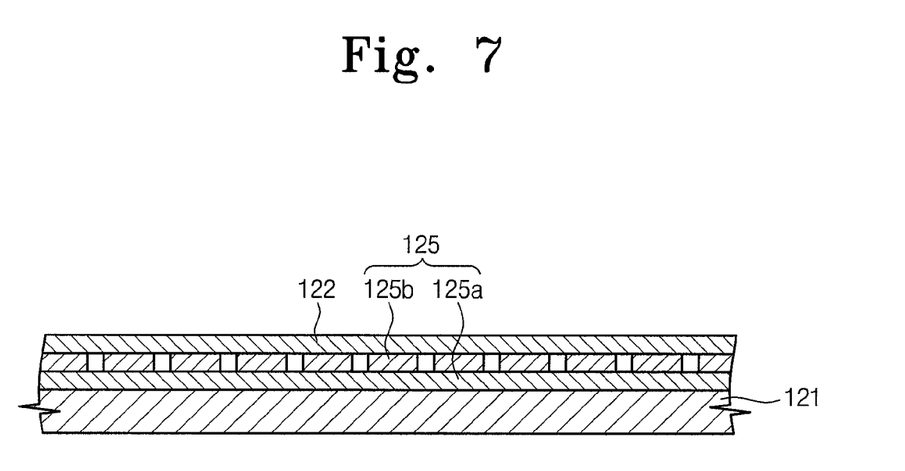
FIG. 7 is a sectional view showing a fluorescent member of FIG. 6.

FIG. 6 is a sectional view showing an exemplary embodiment of the light supply part, and FIG. 7 is a sectional view showing a fluorescent member of FIG. 6.

Referring to FIGS. 2 and 6, the light supply part 120 includes a first electrode 121, a second electrode 122, a fluorescent member 123, a protective member 124, and a second attachment member 125.

Particularly, the first electrode 121 is formed on the first base substrate 110 and includes a metal material such as aluminum. The second electrode 122 faces the first electrode 121 and includes a transparent conductive material such as ITO or Izo.

The fluorescent member 123 is formed between the first electrode 121 and the second electrode 122. The fluorescent member 123 generates light in response to an electric field generated between the first electrode 121 and the second electrode 122, and the light is supplied to the liquid crystal layer 300.

In the present embodiment, the light supply part 120 includes a fluorescent member emitting white light, but in some embodiments, the light supply part 120 may include a fluorescent member emitting RGB light (red, green, and/or blue light).

Referring to FIGS. 2 and 7, the fluorescent member 123 includes a white fluorescent layer 123a formed on the first electrode 121 and a plurality of RGB light emitters such as RGB light emitting parts 123b formed on the white fluorescent layer 123a to emit RGB light.

In the present embodiment, the fluorescent member 123 includes the white fluorescent layer 123a and the RGB light emitting parts 123b to emit RGB light, but in some embodiments the fluorescent member 123 may include RGB fluorescent material or a blue fluorescent layer and a color converting layer for the RGB light.

The white fluorescent layer 123a emits white light in response to an electric field generated between the first electrode 121 and the second electrode 122.

The RGB light emitting parts 123b includes color pixels displaying predetermined colors using the light. The RGB light emitting parts 123b are separated from one another and emit RGB light using the white light provided from the white fluorescent layer 123a. That is, red (R) light emitting parts emit red light, green (G) light emitting parts emit green light, and blue (B) light emitting parts emit blue light, so that the fluorescent member 123 may emit RGB light.

The RGB light emitting parts 123b may be in a one-to-one correspondence relationship with the pixel parts, or each of the RGB light emitting parts 123b may correspond to plural pixel parts. For example, one RGB light emitting part may correspond to one pixel part or three adjacent pixel parts.

In an embodiment in which the RGB light emitting parts 123b are in a one-to-one correspondence relationship with the pixel parts, the RGB light emitting parts 123b may control the gray-scale value of the light (L) according to the gray-scale value of the pixel parts.

That is, the dot part DP includes the three adjacent pixel parts, and the three adjacent pixel parts are in a one-to-one correspondence relationship with three adjacent RGB light emitting parts.

The gray-scale value of the light (L) is adjusted by the electric field generated between the first electrode 121 and the second electrode 122, and the electric field generated between the first and second electrodes 121 and 122 is controlled by the voltages applied to the first and second electrodes 121 and 122, respectively. Thus, when the voltages applied to the first and second electrodes 121 and 122 in response to the gray-scale value of the dot part DP are adjusted, the three adjacent RGB light emitting parts may emit light having same gray-scale value as that of the dot part DP.

In an embodiment in which the RGB light emitting parts 123b are in a one-to-one correspondence relationship with the pixel parts, the RGB light emitting parts 123b correspond to the RGB color pixels 221, respectively, since the pixel parts are in a one-to-one correspondence relationship with the RGB color pixels. Thus, the R light emitting part, the G light emitting part and the B light emitting part correspond to the R color pixel, the G color pixel and the B color pixel of the RGB color pixels 221, respectively.

Accordingly, red light is incident into the R color pixel, green light is incident into the G color pixel, and blue light is incident into the B color pixel. Thus, the color filter layer 220 may receive light having the same colors as those of the RGB color pixels from the light supply part 120, thereby improving color reproducibility of the liquid crystal display 600.

As described above, when the RGB light emitting parts 123b correspond to the RGB color pixels 221, respectively, and the RGB light emitting parts 123b allow the light (L) to have the same gray-scale value as that of the pixel parts, the color reproducibility of the liquid crystal display 600 may be improved, to thereby improve the display characteristic of the liquid crystal display 600.

Referring again to FIGS. 2 and 6, the protective member 124 is formed at an upper portion of the second electrode 122 and faces the first base substrate 110. The protective member 124 is coupled to the first base substrate 110 in order to protect the fluorescent member 123, which is vulnerable to humidity, acid, etc.

The second attachment member 125 is formed between the first base substrate 110 and the protective member 124 and attaches the first base substrate 110 to the protective member 124, thereby sealing the light supply part 120.

As described above, since the light supply part 120 is located inside the liquid crystal display 600 to emit light (L), the liquid crystal display 600 may display the image without employing a separate backlight assembly. This may reduce the thickness and weight of the light crystal display 600, thereby lowering its manufacturing cost.

Further, the distance between the light supply part 120 and the liquid crystal layer 300 of liquid crystal display 600 may be reduced, which may prevent an air layer from being formed between the light supply part 120 and the liquid crystal layer 300. Thus, the above-described embodiment of liquid crystal display 600 may reduce the loss of light (L) and enhance the brightness of the liquid crystal display 600, thereby improving its display characteristics as well.

Hereinafter, various exemplary embodiments of the liquid crystal display will be described in accordance with examples of a position change of the light supply part.

Figure 8:
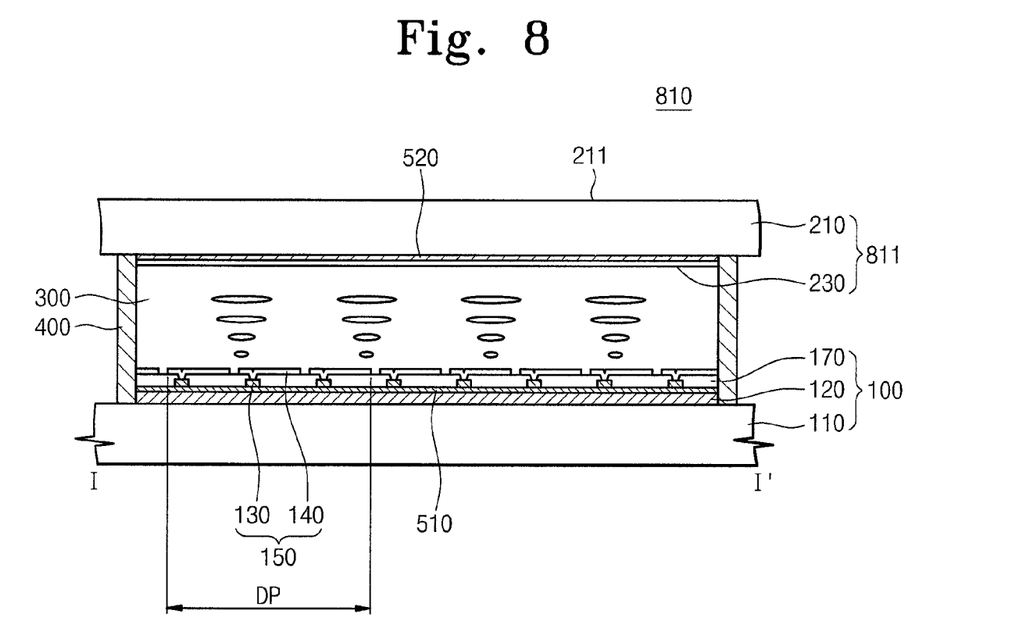
FIG. 8 is a cross-sectional view showing another exemplary embodiment of a liquid crystal display according to the present invention.

FIG. 8 is a cross-sectional view showing another exemplary embodiment of a liquid crystal display according to the present invention. In FIG. 8, the same reference numerals denote the same elements in FIG. 2, and thus the detailed description of the same elements will be omitted.

Referring to FIGS. 7 and 8, a liquid crystal display 810 includes an array substrate 100, an opposite substrate 811 facing the array substrate 100, a liquid crystal layer 300 interposed between the array substrate 100 and the opposite substrate 811 and a first attachment member 400 attaching the array substrate 100 to the opposite substrate 811.

The array substrate 100 includes a first base substrate 110, a light supply part 120 formed on the first base substrate 110, and an array layer 170 at which pixel parts 150 are formed.

The light supply part 120 generates the RGB light in response to an externally provided voltage. That is, the light supply part 120 includes a fluorescent member 123 as shown in FIG. 7 to emit the RGB light, and the fluorescent member 123 emits the RGB light corresponding to respective pixel parts.

The light supply part 120 may generate light having the same gray-scale value as that of the dot part DP defined by the three pixel parts adjacent to one another.

The opposite substrate 811 faces the array substrate 100. The opposite substrate 811 includes a second base substrate 210 and a common electrode 230 formed on the second base substrate 210.

As described above, the light supply part 120 generates the RGB light corresponding to the respective pixel parts, so that the liquid crystal display 810 may display a full-color image without employing a color filter layer displaying predetermined colors. Thus, the number of manufacturing processes for the liquid crystal display 810 may be reduced, thereby reducing the manufacturing cost of the liquid crystal display.

The liquid crystal display 810 may further include a first polarization member 510 and a second polarization member 520. The first polarization member 510 is formed between the light supply part 120 and the array layer 170 to polarize the light from the light supply part 120. The second polarization member 520 is formed between the second base substrate 210 and the common electrode 230 to polarize the light passing through the liquid crystal layer 300. In the present embodiment, the second polarization member 520 located inside the liquid crystal display 810 has been shown, but in some embodiments the second polarization member 520 may be formed on an external face 211 of the second base substrate 210.

Although not shown in FIG. 8, the first polarization member 510 may be patterned to have the dot pattern as shown in FIG. 4. In such an embodiment, the array substrate 100 further includes an insulation layer 530 as shown in FIG. 4 between the first polarization member 510 and the array layer 170 to insulate the first polarization member 510 from the pixel parts 150.

Figure 9:
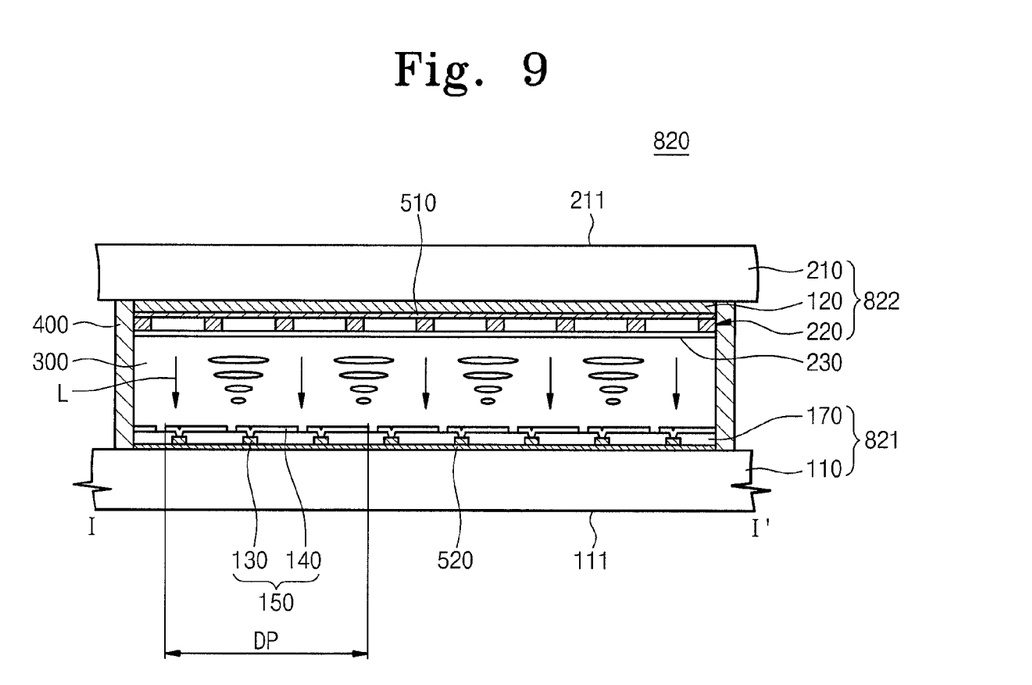
FIG. 9 is a cross-sectional view showing another exemplary embodiment of a liquid crystal display according to the present invention.

FIG. 9 is a cross-sectional view showing another exemplary embodiment of a liquid crystal display according to the present invention. In FIG. 9, the same reference numerals denote the same elements in FIG. 2, and thus the detailed description of these elements may be omitted.

Referring to FIG. 9, a liquid crystal display 820 includes an array substrate 821, an opposite substrate 822, a liquid crystal layer 300, and a first attachment member 400 attaching the array substrate 821 to the opposite substrate 822.

In particular, the array substrate 821 includes a first base substrate 110 and an array layer 170 formed at an upper portion of the first base substrate 110. The array layer 170 includes a plurality of pixel parts 150 and applies the pixel voltage to the liquid crystal layer 300.

The opposite substrate 822 faces the array substrate 821 and is attached to the array substrate 821. The opposite substrate 822 includes a second base substrate 210, a light supply part 120, a color filter layer 220, and a common electrode 230.

The light supply part 120 is formed on the second base substrate 210 and generates light (L) to provide the light (L) to the liquid crystal layer 300. In the present embodiment, the light (L) generated by the light supply part 120 may be white light and/or RGB light.

The color filter layer 220 is formed on the light supply part 120 and displays predetermined colors using the light (L).

In the present embodiment, the opposite substrate 822 includes the color filter layer 220, but the color filter layer 220 may be omitted from the opposite substrate 822 in embodiments in which the light (L) generated by the light supply part 120 is RGB light. When the color filter layer 220 is omitted from the opposite substrate 822, the light supply part 120 generates RGB light corresponding to respective pixel parts 150 of the arrays layer 170.

The common electrode 230 is formed on the color filter layer 220 to apply a common voltage to the liquid crystal layer 300.

The liquid crystal layer 300 is interposed between the array substrate 821 and the opposite substrate 822. The liquid crystal layer 300 controls the transmittance of the light (L) passing through the color filter layer 220 and provides the array substrate 821 with the light (L), to display the image on the liquid crystal display 820.

In the present embodiment, since the opposite substrate 822 includes the light supply part 120, the light (L) generated from the light supply part 120 is transmitted toward the array substrate 821 from the opposite substrate 822. Thus, the image is displayed on an external face 111 of the first base substrate 110.

The liquid crystal display 820 further includes a first polarization member 510 and a second polarization member 520. The first polarization member 510 is disposed between the light supply part 120 and the color filter layer 220 to polarize light (L) generated by the light supply part 120. The second polarization member 520 is disposed between the first base substrate 110 and the array layer 170 to polarize the light (L) passing through the liquid crystal layer 300 in a direction substantially perpendicular to the polarization direction of the first polarization member 510.

Although not shown in FIG. 9, the first polarization member 510 may be patterned to have a dot pattern such as the pattern shown in FIG. 4. In such an embodiment, the insulation layer 530 as shown in FIG. 4 is not necessary for the opposite substrate 822 since the pixel parts 150 and the array substrate 170 are formed on the array substrate 821.

Figure 10:
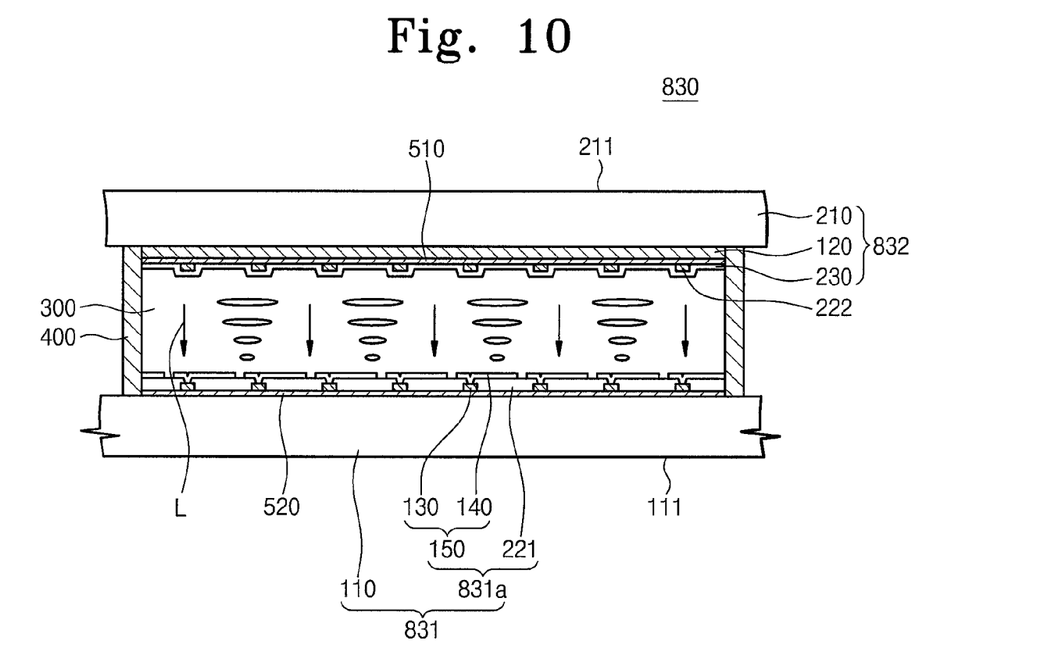
FIG. 10 is a cross-sectional view showing another exemplary embodiment of a liquid crystal display of the present invention.

FIG. 10 is a cross-sectional view showing another exemplary embodiment of a liquid crystal display of the present invention. In FIG. 10, the same reference numerals denote the same elements in FIG. 9, and thus the detailed description of such elements may be omitted.

Referring to FIG. 10, a liquid crystal display 830 includes an array substrate 831, an opposite substrate 832, a liquid crystal layer 300 and a first attachment member 400 that attaches the array substrate 831 to the opposite substrate 832.

The array substrate 831 includes a first base substrate 110 and an array layer 831a formed on the first base substrate 110.

The array layer 831a includes a plurality of pixel parts 150 and a plurality of RGB color pixels 221. Each of the pixel parts 150 includes a TFT 130 and a pixel electrode 140 electrically connected to the TFT 130 to output a pixel voltage and apply the pixel voltage to the liquid crystal layer 300.

The RGB color pixels 221 are formed on the first base substrate 110 on which the TFT 130 is formed to display predetermined colors using light (L). The pixel electrode 140 is formed on the RGB color pixels 221 and electrically connected to the TFT 130 through a contact hole formed by removing a portion of the RGB color pixels 221.

Although not shown in FIG. 10, the array layer 831a may further include a gate insulation layer 161 (see FIG. 3) and a protective layer 162 (see FIG. 3), and the RGB color pixels 221 may be formed on the protective layer 162.

The opposite substrate 832 faces the arrays substrate 831. The opposite substrate 832 includes a second base substrate 210, a light supply part 120, a black matrix 222 and a common electrode 230.

The light supply part 120 is formed on the second base substrate 210. The light supply part 120 generates light (L) and provides light to the liquid crystal layer 300. In the present embodiment, the light (L) generated by the light supply part 120 may be white light or RGB light.

The black matrix 222 is formed at an upper portion of the light supply part 120. The black matrix 222 is located at a position corresponding to a peripheral area of the respective RGB color pixels to enhance the contrast ratio.

The common electrode 230 is formed on the second base substrate 210 on which the black matrix 222 is formed to apply the common voltage to the liquid crystal layer 300.

The liquid crystal layer 300 is disposed between the array substrate 831 and the opposite substrate 832 to control the transmittance of light (L) generated from the light supply part 120. The light (L) passing through the liquid crystal layer 300 is incident into the array substrate 831, and the RGB color pixels 222 display predetermined colors using the light (L). Thus, the liquid crystal display 830 may display the image on an external face 111 of the first base substrate 110.

The liquid crystal display 830 further includes a first polarization member 510 and a second polarization member 520. The first polarization member 510 is formed on the light supply part 120, and the black matrix 222 is formed on the first polarization member 510. The second polarization member 520 is positioned between the first base substrate 110 and the array layer 831a.

Although not shown in FIG. 10, the first polarization member 510 may be patterned to have the dot pattern such as the pattern shown in FIG. 4. In such an embodiment, an insulation layer 530 such as the layer shown in FIG. 4 need not be formed on the opposite substrate 822, since the array layer 831a is formed on the array substrate 821.

Figure 11:
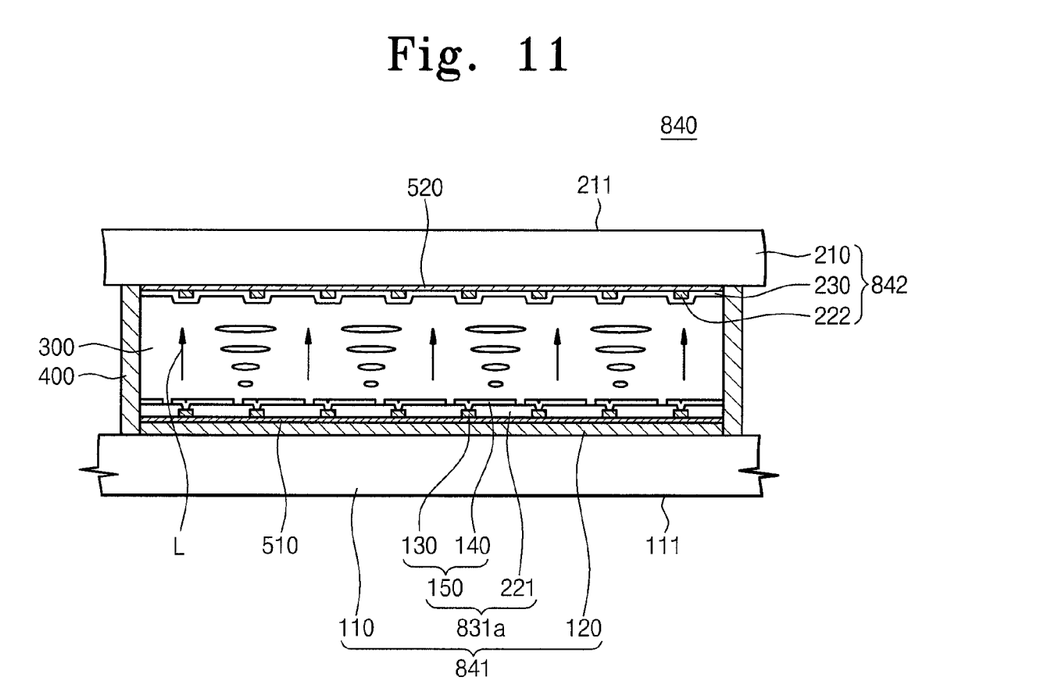
FIG. 11 is a cross-sectional view showing another exemplary embodiment of a liquid crystal display according to the present invention.

FIG. 11 is a cross-sectional view showing another exemplary embodiment of a liquid crystal display according to the present invention. In FIG. 11, the same reference numerals denote the same elements in FIG. 10, and thus detailed description of such elements may be omitted.

Referring to FIG. 11, a liquid crystal display 840 includes an array substrate 841, an opposite substrate 842, a liquid crystal layer 300 and a first attachment member 400 that attaches the array substrate 841 to the opposite substrate 842.

The array substrate 841 includes a first base substrate 110, a light supply part 120 and an array layer 831a.

The light supply part 120 is formed on the first base substrate 110. The light supply part 120 generates light (L) that is provided to the liquid crystal layer 300 in response to an applied voltage (or other application of power to light supply part 120). In the present embodiment, the light (L) generated by the light supply part 120 may be white light or RGB light.

The array layer 831a is formed on the light supply part 120 and includes a plurality of pixel parts 150 and a plurality of RGB color pixels 221. Each of the pixel parts 150 includes a TFT 130 and a pixel electrode 140 electrically connected to the TFT 130 to output a pixel voltage and apply the pixel voltage to the liquid crystal layer 300. The RGB color pixels 221 are formed on the first base substrate 110 on which the pixel parts 150 are formed to display predetermined colors using the light (L).

The opposite substrate 842 faces the arrays substrate 841. The opposite substrate 842 includes a second base substrate 210, a black matrix 222, and a common electrode 230.

The black matrix 222 is formed at an upper portion of the second base substrate 210. The black matrix 222 is located at a position corresponding to a peripheral area of the respective RGB color pixels 221 to enhance the contrast ratio. The common electrode 230 is formed on the second base substrate 210 on which the black matrix 222 is formed to apply the common voltage to the liquid crystal layer 300.

The liquid crystal layer 300 is disposed between the array substrate 841 and the opposite substrate 842 to control the transmittance of the light (L) generated by the light supply part 120 that is transmitted through liquid crystal layer 300. That is, the light supply part 120 provides the RGB color pixels 222 with light (L), and light (L) is provided to the liquid crystal layer 300 through the RGB color pixels 222. The liquid crystal layer 300 controls the transmittance of the light (L) passing through the RGB color pixels 222 to provide the opposite substrate 842 with light (L), thereby displaying the image on an external face 211 of the second base substrate 210.

Further, the liquid crystal display 840 further includes a first polarization member 510 and a second polarization member 520. The first polarization member 510 is formed between the light supply part 120 and the array layer 831a, and the second polarization member 520 is formed on the second base substrate 210.

Although not shown in FIG. 11, the first polarization member 510 may be patterned to have a dot pattern as the pattern shown in FIG. 4 when viewed in a plan view. Further, in embodiments in which the first polarization member 510 includes a metal material, an insulation layer (not shown in FIG. 11, see FIG. 4) is further formed between the first polarization member 510 and the array layer 831a to insulate the first polarization member 510 and the pixel parts 150.

According to the above-described embodiments of a liquid crystal display, the light supply part is disposed between the array substrate and the opposite substrate and formed on the array substrate or the opposite substrate. Thus, the liquid crystal display does not need to employ a separate backlight assembly, so that the thickness and the weight of the liquid crystal display may be reduced, thereby lowering the manufacturing cost of the liquid crystal display.

Further, since the light supply part is located inside the liquid crystal display, the distance between the light supply part and the liquid crystal layer decreases, so that formation of an air layer between the light supply part and the liquid crystal layer may be prevented. Thus, the liquid crystal display may have reduced light loss and enhanced brightness, thereby improving the display characteristics of the liquid crystal display.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
    a first base substrate;
    a second base substrate attached to the first base substrate;
    a liquid crystal layer disposed between the first base substrate and the second base substrate and configured to controlling transmittance of light to display an image based on applied pixel voltage;
    a light supply part configured to generate light to supply the light to the liquid crystal layer, the light supply unit being disposed between the first base substrate and the liquid crystal layer; and
    an array layer having at least one pixel part configured to output the pixel voltage, the array layer being interposed between the light supply part and the second base substrate.

2. The liquid crystal display of claim 1, wherein the light supply part comprises:
    a first electrode part formed on the first base substrate;
    a second electrode part formed on the first base substrate;
    a fluorescent member configured to emit light in accordance with an electric field formed between the first and second electrode parts, the fluorescent member being disposed between the first and second electrode parts; and a protective member interposed between the second electrode part and the liquid crystal layer and coupled to the first base substrate.

3. The liquid crystal display of claim 2, wherein the fluorescent member is configured to emit red light, green light, and blue light.

4. The liquid crystal display of claim 3, wherein the fluorescent member comprises:
- at least one first light emitter part to emit the red light;
- at least one second light emitter part to emit the green light; and
- at least one third light emitter part to emit the blue light.

5. The liquid crystal display of claim 4, wherein the array layer comprises a plurality of pixel parts, and the first, second and third light emitter parts are each positioned at a position corresponding to any one of the plurality of pixel parts.

6. The liquid crystal display of claim 5, wherein the array layer comprises at least one dot part configured to have a gray-scale value corresponding to the image, the dot part comprises at least three pixel parts adjacent to each other, the first, second and third pixel parts adjacent to each other correspond to the dot part, and the light emitted from the adjacent first, second and third to each other has a same gray-scale value as that of the dot part.

7. The liquid crystal display of claim 6, further comprising:
- a plurality of color pixels displaying a predetermined color in response to the light from the liquid crystal layer, the color pixels being interposed between the first and second base substrates,
- wherein each of the color pixels is positioned at a position corresponding to any one of the first, second and third light emitting parts, and each of the first, second and third light emitting parts emits the light having a same color as that of a corresponding color pixel among the color pixels.

8. The liquid crystal display of claim 2, wherein the fluorescent member is configured to emit white light.

9. The liquid crystal display of claim 1, further comprising a plurality of color pixels each configured to display an associated predetermined color in response to receiving light from the liquid crystal layer, the color pixels being interposed between the first and second base substrates.

10. The liquid crystal display of claim 9, wherein the plurality of color pixels are disposed between the array layer and the liquid crystal layer.

11. The liquid crystal display of claim 10, wherein the array layer is interposed between the liquid crystal layer and the second base substrate.

12. The liquid crystal display of claim 10, wherein the array layer is interposed between the liquid crystal layer and the light supply part.

13. The liquid crystal display of claim 9, wherein the plurality of color pixels are disposed between the liquid crystal layer and the second base substrate, and the array layer is disposed between the liquid crystal layer and the light supply part.

14. The liquid crystal display of claim 9, wherein the plurality of color pixels are interposed between the liquid crystal layer and the light supply part, and the array layer is interposed between the liquid crystal layer and the second base substrate.

15. The liquid crystal display of claim 1, further comprising:
- a first polarization member configured to polarize light from the light supply part, the first polarization member being disposed between the light supply part and the liquid crystal display; and
- a second polarization member configured to polarize light from the liquid crystal layer, the second polarization member facing the first polarization member.

16. The liquid crystal display of claim 15, wherein the first polarization member comprises a patterned metal material including a reflective pattern, and the first polarization member is formed on a face of the light supply part.

17. The liquid crystal display of claim 15, wherein the second polarization member is located at a face of the second base substrate.

18. The liquid crystal display of claim 15, wherein the second polarization member is disposed between the second base substrate and the liquid crystal layer.

* * * * *